United States Patent
Kawai

(10) Patent No.: US 12,017,313 B2
(45) Date of Patent: Jun. 25, 2024

(54) IMPACT TOOL

(71) Applicant: MAKITA CORPORATION, Anjo (JP)

(72) Inventor: Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 87 days.

(21) Appl. No.: 17/958,902

(22) Filed: Oct. 3, 2022

(65) Prior Publication Data

US 2023/0158623 A1 May 25, 2023

(30) Foreign Application Priority Data

Nov. 25, 2021 (JP) .................................. 2021-191424

(51) Int. Cl.
*B25B 21/02* (2006.01)
*B23Q 11/12* (2006.01)

(52) U.S. Cl.
CPC .......... *B23Q 11/122* (2013.01); *B25B 21/026* (2013.01)

(58) Field of Classification Search
CPC .............................. B25B 21/023; B25B 21/026
See application file for complete search history.

(56) References Cited

U.S. PATENT DOCUMENTS

| 2009/0223690 | A1* | 9/2009 | Sugimoto | B25B 21/026 173/48 |
| 2021/0031342 | A1* | 2/2021 | Takahagi | B25B 21/023 |
| 2021/0162571 | A1* | 6/2021 | Kondo | B25B 21/026 |

FOREIGN PATENT DOCUMENTS

JP 2020188631 A 11/2020

* cited by examiner

*Primary Examiner* — Michelle Lopez
(74) *Attorney, Agent, or Firm* — Oliff PLC

(57) ABSTRACT

An impact driver includes a motor, a spindle, a hammer externally and coaxially mounted on the spindle to receive rotation of the spindle and move relative to the spindle in an axial direction, an anvil in front of the hammer and coaxial with the spindle to be struck by the hammer in a rotation direction, and a hammer case accommodating the spindle, the hammer, and the anvil, allowing a front end of the anvil to protrude frontward from the hammer case, and filled with grease. The spindle includes a grease supply path located in the spindle and open in a sliding surface of the spindle on which the hammer slides to allow grease to be supplied to the sliding surface, and an accelerator in the spindle to accelerate a flow of the grease onto the sliding surface along the grease supply path in response to rotation of the motor.

19 Claims, 9 Drawing Sheets

IMPACT TOOL

CROSS-REFERENCE TO RELATED APPLICATIONS

This application claims the benefit of priority to Japanese Patent Application No. 2021-191424, filed on Nov. 25, 2021, the entire contents of which are hereby incorporated by reference.

BACKGROUND

1. Technical Field

The present invention relates to an impact tool such as an impact driver.

2. Description of the Background

An impact tool such as an impact driver includes a motor in its rear portion and a striker including an anvil for rotary striking as driven by the motor in its front portion. Such an impact tool is described in, for example, Japanese Unexamined Patent Application Publication No. 2020-188631. The striker further includes a spindle rotatable in response to rotation of the motor and a hammer connected to the spindle with a cam with balls in between. A coil spring externally mounted on the spindle urges the hammer to a forward position, allowing a tab on a front surface of the hammer to be engageable with an arm of the anvil in a rotation direction.

The striker is accommodated in a hammer case. The hammer case is filled with grease. The spindle has a through-hole and a connection hole that orthogonally connects with the through-hole. The grease in the hammer case is supplied to sliding surfaces of the spindle and the hammer from the through-hole through the connection hole. The impact tool may include a striker unit with another structure.

BRIEF SUMMARY

When an insufficient amount of grease is supplied to the sliding surfaces of the spindle and the hammer, the impact tool may have seizure and fail to strike. Such supply of an insufficient amount of grease may also occur to the striker unit with the other structure.

One or more aspects of the present disclosure are directed to an impact tool that supplies a sufficient amount of grease to sliding surfaces of a spindle and a hammer.

One or more aspects of the present disclosure are directed to an impact tool that supplies a sufficient amount of grease to a striker unit.

A first aspect of the present disclosure provides an impact tool, including:
- a motor;
- a spindle rotatable by the motor;
- a hammer externally and coaxially mounted on the spindle, the hammer being configured to receive rotation of the spindle and movable relative to the spindle in an axial direction;
- an anvil located in front of the hammer and coaxial with the spindle, the anvil being configured to be struck by the hammer in a rotation direction; and a hammer case accommodating the spindle, the hammer, and the anvil, the hammer case allowing a front end of the anvil to protrude frontward from the hammer case, the hammer case being filled with grease, wherein the spindle includes
- a grease supply path located in the spindle, the grease supply path being open in a sliding surface of the spindle on which the hammer slides, the grease supply path allowing grease to be supplied to the sliding surface, and
- an accelerator disposed in the spindle, the accelerator being configured to accelerate a flow of the grease onto the sliding surface along the grease supply path in response to rotation of the motor.

A second aspect of the present disclosure provides an impact tool, including:
- a motor;
- a striker unit drivable by the motor;
- an anvil configured to be struck by the striker unit in a rotation direction; and
- an accelerator configured to accelerate a flow of grease supplied to the striker unit.

The technique according to the above aspects of the present disclosure allows supply of a sufficient amount of grease to the sliding surfaces of the spindle and the hammer or to the striker unit.

DETAILED DESCRIPTION

First Embodiment

Embodiments of the present disclosure will now be described with reference to the drawings.

Figure 1:
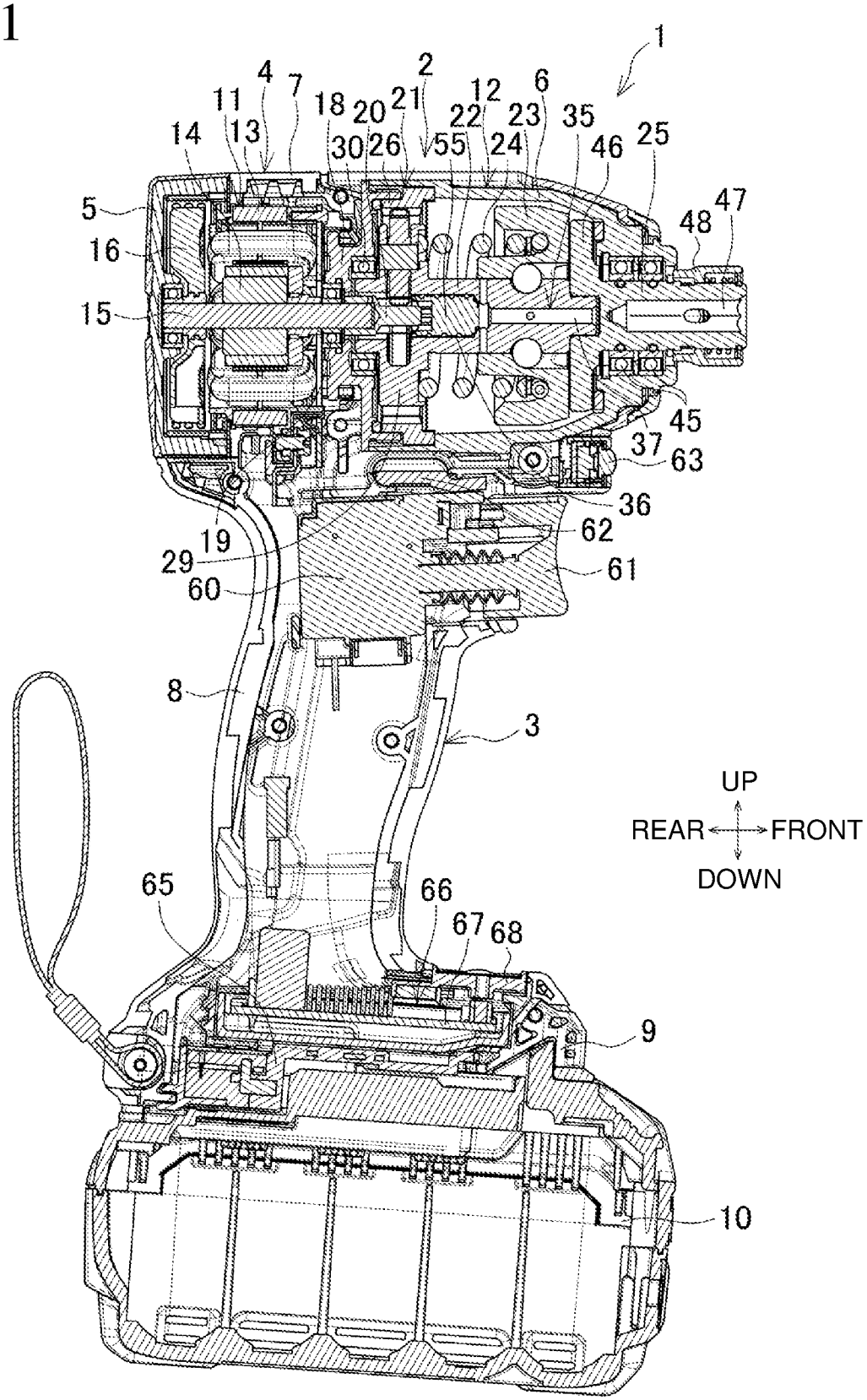
FIG. 1 is a longitudinal central sectional view of an impact driver according to a first embodiment.
Figure 2:
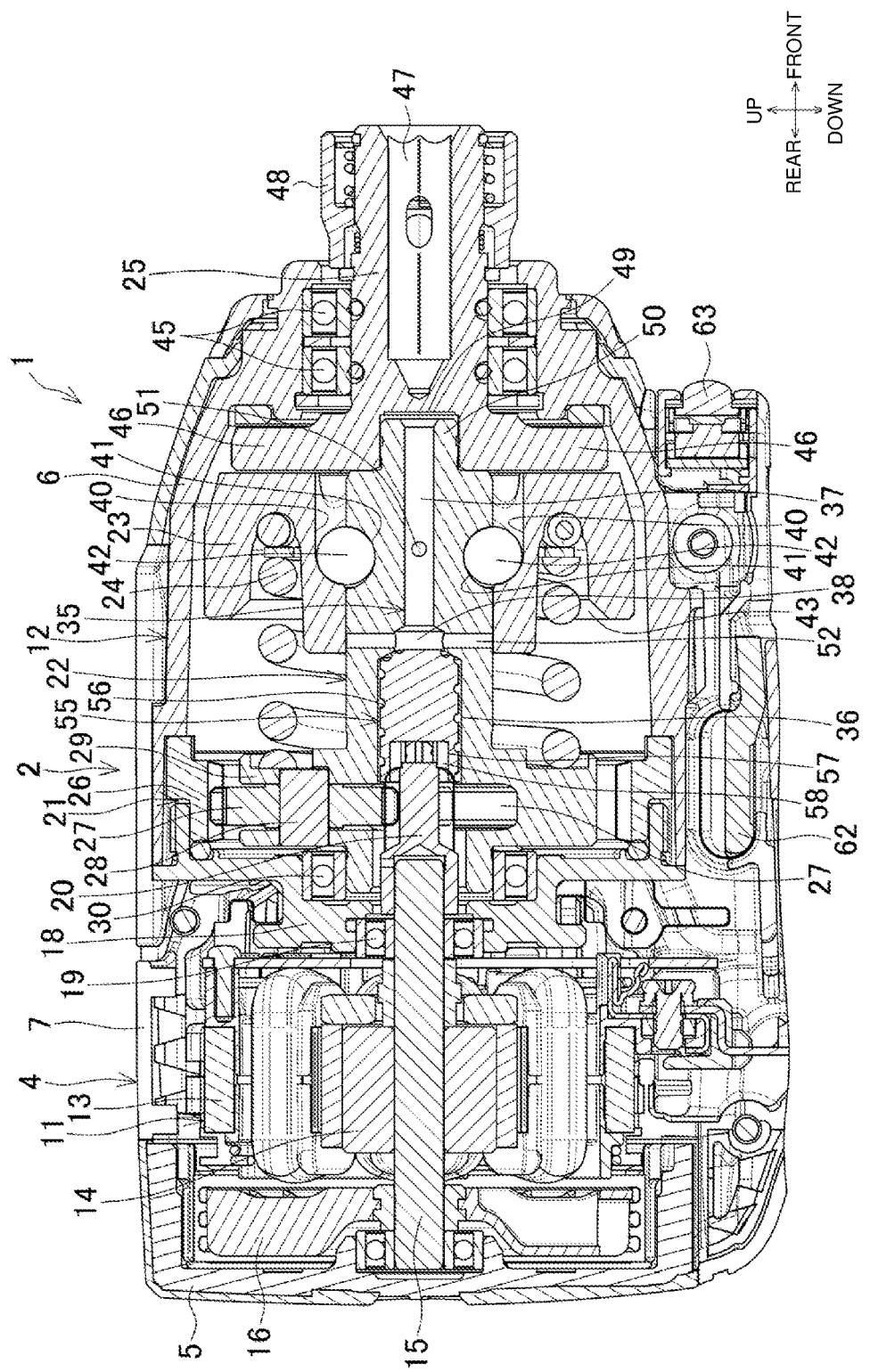
FIG. 2 is an enlarged view of a body in FIG. 1.

FIG. 1 is a longitudinal central sectional view of a rechargeable impact driver as an example of an impact tool. FIG. 2 is an enlarged view of a body in FIG. 1.

An impact driver 1 includes a body 2 and a grip 3. The body 2 includes a central axis extending in a front-rear direction. The grip 3 extends downward from the body 2.

The impact driver 1 includes a housing including a body housing 4, a rear cover 5, and a hammer case 6. The body housing 4 includes a motor housing 7, a grip housing 8, and a battery mount 9. A battery pack 10, which serves as a power supply, is attached to the battery mount 9. The motor housing 7 is cylindrical and defines a rear portion of the body 2. The grip housing 8 defines the grip 3.

The body housing 4 includes a pair of right and left housing halves fastened with screws. The rear cover 5 is a cap. The rear cover 5 is joined to the motor housing 7 from the rear with screws.

The body 2 includes a brushless motor 11 and a striker 12 in this order from the rear. The motor housing 7 and the rear cover 5 accommodate the brushless motor 11.

The brushless motor 11 is an inner-rotor motor and includes a stator 13 and a rotor 14. The stator 13 is held in the motor housing 7. The rotor 14 includes a rotational shaft 15 at its center. The rotational shaft 15 extends through the stator 13 in the front-rear direction. A fan 16 is fixed to a rear end of the rotational shaft 15.

The striker 12 includes an outer shell including the hammer case 6 and a bearing box 18. The hammer case 6 is formed from a metal and is cylindrical and tapered frontward. The bearing box 18 is formed from a metal and is disk-shaped. The bearing box 18 is screwed in an opening at the rear end of the hammer case 6. The striker 12 is held by the motor housing 7 and causes a front portion of the hammer case 6 to protrude frontward. The rotational shaft 15 extends through the bearing box 18 and protrudes in the striker 12. The rotational shaft 15 is supported by a bearing 19 held in the bearing box 18. A pinion 20 is fixed to a distal end of the rotational shaft 15.

The striker 12 includes a reducer 21, a spindle 22, a hammer 23, a coil spring 24, and an anvil 25.

The reducer 21 includes an internal gear 26 and three planetary gears 27. The internal gear 26 is held in a rear portion of the striker 12. Each planetary gears 27 is supported by a carrier 29 on the spindle 22 in the internal gear 26 with a pin 28. The planetary gears 27 mesh with the pinion 20 on the rotational shaft 15.

The spindle 22 includes the carrier 29 in its rear portion. The carrier 29 is hollow and disk-shaped. The spindle 22 has its rear end supported by the bearing box 18 with a bearing 30 in between.

The spindle 22 has a through-hole 35 at its axial center. The through-hole 35 includes a rear larger-diameter hole 36 and a front smaller-diameter hole 37. The larger-diameter hole 36 is open in a rear end face of the spindle 22. The smaller-diameter hole 37 is open in a front end face of the spindle 22. A medium-diameter hole 38 shorter in the front-rear direction is located between the larger-diameter hole 36 and the smaller-diameter hole 37. The pinion 20 on the rotational shaft 15 protrudes from the rear of the spindle 22 in the larger-diameter hole 36 and meshes with the planetary gears 27.

The hammer 23 is externally mounted on the spindle 22. The hammer 23 includes a set of tabs (not shown) on its front surface. The hammer 23 includes a pair of outer cam grooves 40 on its inner peripheral surface. The pair of outer cam grooves 40 are point-symmetric to each other about an axis of the hammer 23. The outer cam grooves 40 extend rearward from the front end. The spindle 22 includes a pair of inner cam grooves 41 on its outer peripheral surface. The inner cam grooves 41 are V-shaped and have their tips facing frontward. Balls 42 are fitted in the corresponding outer cam grooves 40 and in the corresponding inner cam grooves 41. Each ball 42 is received across the corresponding grooves. The balls 42 allow the hammer 23 and the spindle 22 to rotate and translate. The hammer 23 has an annular groove 43 on its rear surface.

The coil spring 24 is externally mounted on the spindle 22 between the carrier 29 and the hammer 23. The coil spring 24 is positioned with its rear end in contact with the front surface of the carrier 29 and its front end placed in the annular groove 43.

The anvil 25 is located in front of the spindle 22 and the hammer 23 and coaxial with the spindle 22. Two bearings 45 arranged in the front-rear direction are at the front end of the hammer case 6. The bearings 45 support the anvil 25. The anvil 25 includes a set of arms 46 behind the bearings 45. The coil spring 24 urges the hammer 23 to the forward position in FIG. 1. At the forward position, the tabs on the hammer 23 are engageable with the arms 46 in the rotation direction. The anvil 25 has its front end protruding frontward from the hammer case 6. The anvil 25 has a bit insertion hole 47 along its axis. An operation sleeve 48 for attaching or detaching a bit is located at the front end of the anvil 25.

The anvil 25 has a fitting recess 49 at the center of its rear surface. The spindle 22 includes a fitting protrusion 50 fitted in the fitting recess 49 at the center of its front end. The smaller-diameter hole 37 of the through-hole 35 extends through the fitting protrusion 50 and is connected to the fitting recess 49.

The spindle 22 has a front connection hole 51 and a rear connection hole 52. The front connection hole 51 is connected to the smaller-diameter hole 37 between the pair of inner cam grooves 41 and is open in the outer peripheral surface of the spindle 22. The rear connection hole 52 is connected to the medium-diameter hole 38 and is open in the outer peripheral surface of the spindle 22. The front connection hole 51 and the rear connection hole 52 are orthogonal to each other as viewed from the front and face the inner peripheral surface of the hammer 23 at the forward position.

Figure 3:
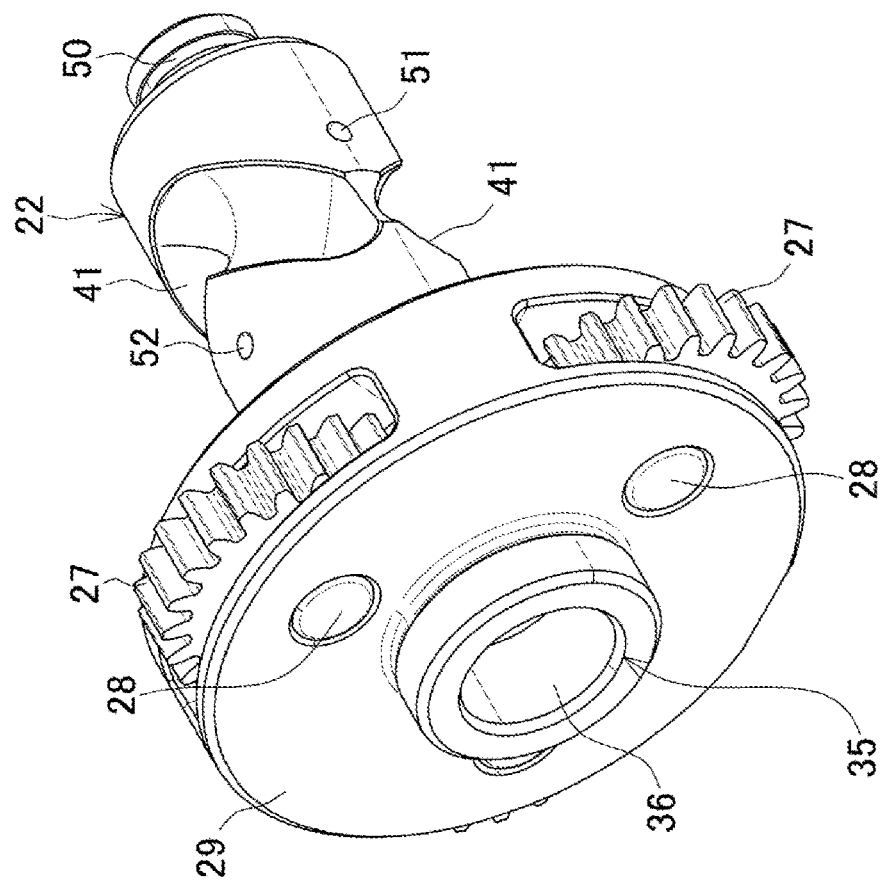
FIG. 3 is an exploded perspective view of a spindle and a pump member as viewed from the rear.
Figure 3:
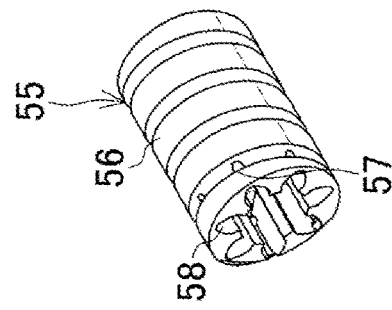
Figure 3:
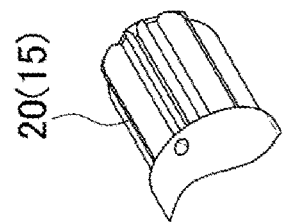
Figure 4:
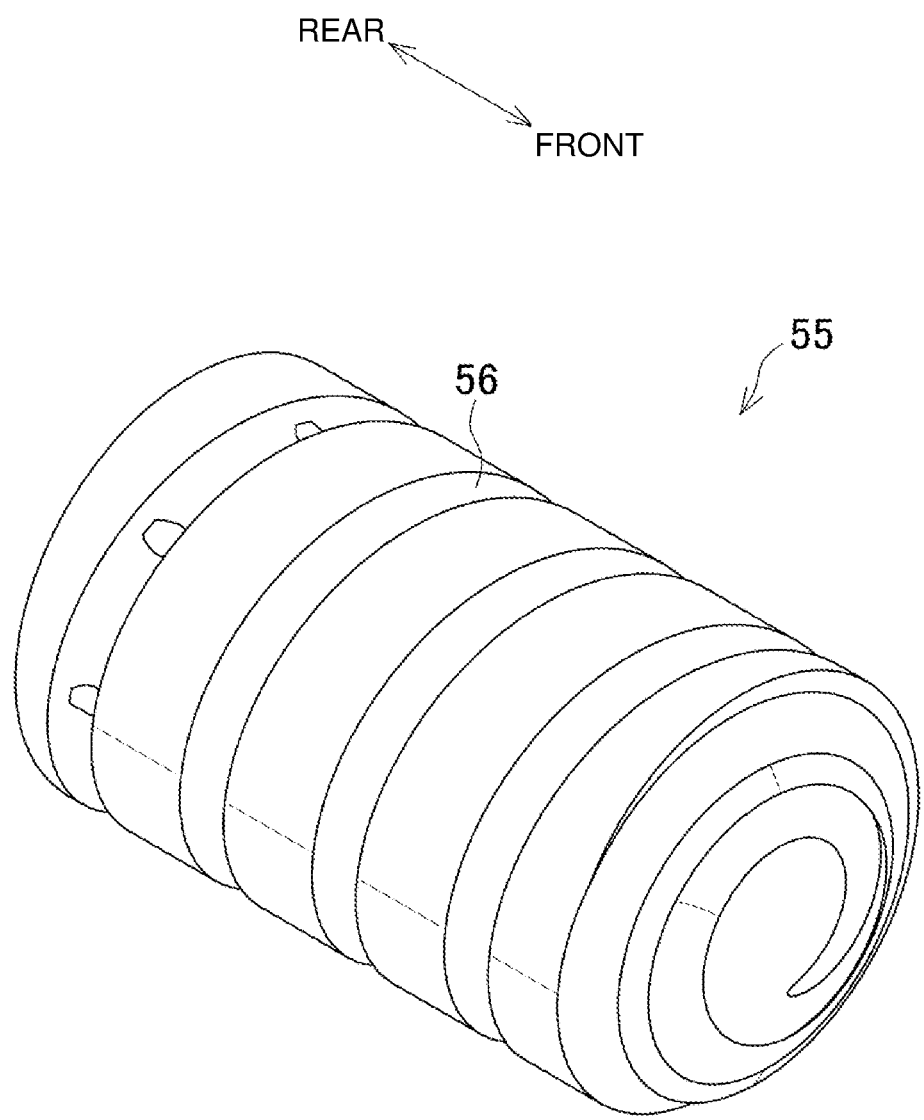
FIG. 4 is an enlarged perspective view of the pump member as viewed from the front.

The larger-diameter hole 36 accommodates a pump member 55. The pump member 55 is a circular shaft as viewed from the front as shown in FIGS. 3 and 4. The pump member 55 is formed from a resin or a metal. The pump member 55 has, on its outer peripheral surface, a groove 56 that spirals in a counterclockwise direction toward the front. The groove 56 has a semicircular cross section. The pump member 55 has, in its rear portion, a blind hole 57 open in the rear surface. The blind hole 57 has an inner peripheral surface defining a gear-shaped engagement portion 58. The pinion 20 on the rotational shaft 15 has its outer shape to be fitted in the engagement portion 58.

The larger-diameter hole 36 accommodates the pump member 55 with the front end of the pinion 20 engaged with the engagement portion 58 to be integral with each other in the rotation direction. In this case, the front end of the pump member 55 is near a front inner surface of the larger-diameter hole 36. The groove 56 extends to the front surface of the pump member 55 and is connected to the medium-diameter hole 38.

The striker 12 is filled with grease. The grease flows into the larger-diameter hole 36 in the spindle 22 through a gap in the carrier 29.

The grip 3 accommodates a switch 60 in its upper portion. A trigger 61 protrudes in front of the switch 60.

A forward-reverse switch lever 62 for the brushless motor 11 is located between the striker 12 and the switch 60. A mode switch 63 is located in front of the forward-reverse switch lever 62. The mode switch 63 faces frontward and has a button exposed on the front surface. The button in the mode switch 63 is repeatedly pressed to switch impact forces or registered striking modes.

The battery mount 9 accommodates a terminal base 65 and a controller 66. The terminal base 65 is electrically connected to the battery pack 10. The controller 66 is located above the terminal base 65. The controller 66 includes a control circuit board 67 receiving, for example, a microcomputer and switching elements. A display panel 68 is located on the upper surface of the battery mount 9. The display panel 68 displays the rotational speed of the brushless motor 11 and the remaining battery level of the battery pack 10.

In the impact driver 1, the trigger 61 is pressed to turn on the switch 60 after a bit (not shown) is attached to the anvil 25. The brushless motor 11 is then powered to rotate (rotate forward) the rotational shaft 15 with the rotor 14. Thus, the planetary gears 27 engaged with the pinion 20 revolve in the internal gear 26. This causes the spindle 22 to rotate at a lower speed with the carrier 29. The hammer 23 then rotates together with the spindle 22 with the balls 42 in between, thus rotating the anvil 25 with the arms 46 engaged with the tabs. This allows tightening a screw with the bit.

As a screw is tightened and increases the torque of the anvil 25, the hammer 23 retracts against the urging force from the coil spring 24 while rolling the balls 42 along the inner cam grooves 41 on the spindle 22. After the tabs are disengaged from the arms 46, the hammer 23 rotates forward along the inner cam grooves 41 under the urging force from the coil spring 24. This then causes the tabs to be reengaged with the arms 46. Thus, the anvil 25 generates a rotational striking force (impact). This process is repeated to further tighten the screw.

As the rotational shaft 15 and the pinion 20 rotate, the pump member 55 engaged with the pinion 20 rotates (rotates forward) integrally. This generates a difference in a rotational speed between the pump member 55 rotating integrally with the pinion 20 and the spindle 22 that rotates at a lower speed reduced by the reducer 21. This difference in the rotational speed causes, in the larger-diameter hole 36, grease between the outer peripheral surface of the pump member 55 and the inner peripheral surface of the larger-diameter hole 36 to be fed forward along the groove 56 that rotates. The grease fed forward flows into the medium-diameter hole 38 from the front end of the groove 56. A portion of the grease is supplied to the sliding surfaces of the spindle 22 and the hammer 23 through the rear connection hole 52 under a centrifugal force. Another portion of the grease flowing into the medium-diameter hole 38 flows inside the smaller-diameter hole 37 and is supplied to the sliding surfaces of the spindle 22 and the hammer 23 through the front connection hole 51 under a centrifugal force. Thus, the sliding surfaces are lubricated during an operation of the impact driver 1.

A portion of the grease flowing through the front connection hole 51 into the smaller-diameter hole 37 flows into the fitting recess 49 on the anvil 25 to lubricate the spindle 22 and the anvil 25.

As the rotational shaft 15 and the pinion 20 rotate reversely, the pump member 55 also rotates reversely. The difference in the speed between the spindle 22 and the pump member 55 causes grease between the outer peripheral surface of the pump member 55 and the inner peripheral surface of the larger-diameter hole 36 to be fed backward along the groove 56. The grease thus lubricates portions of the pinion 20 and the planetary gears 27 engaged with each other.

The impact driver 1 according to the first embodiment includes the brushless motor (an example of a motor) 11 and the spindle 22 rotatable by the brushless motor 11. The impact driver 1 includes the hammer 23 that is externally and coaxially mounted on the spindle 22 to receive rotation of the spindle 22 and movable relative to the spindle 22 in the axial direction. The impact driver 1 includes the anvil 25 that is located in front of the hammer 23 and coaxial with the spindle 22 and is struck by the hammer 23 in the rotation direction. The impact driver 1 includes the hammer case 6 accommodating the spindle 22, the hammer 23, and the anvil 25 and allowing the front end of the anvil 25 to protrude frontward from the hammer case 6. The hammer case 6 is filled with grease. The spindle 22 has the through-hole 35, the front connection hole 51, and the rear connection hole 52 (examples of a grease supply path) that are open in the sliding surface of the spindle 22 on which the hammer 23 slides to allow grease to be supplied to the sliding surface. The spindle 22 also includes the pump member 55 (an example of an accelerator) that accelerates the flow of the grease onto the sliding surface in the through-hole 35 in response to rotation of the brushless motor 11.

This structure uses the pump member 55 to supply a sufficient amount of grease to the sliding surfaces of the spindle 22 and the hammer 23.

The accelerator is the pump member 55 (an example of a rotation member) that rotates in the through-hole 35 in response to rotation of the brushless motor 11.

The pump member 55 rotates to accelerate the flow of the grease.

The rotational shaft 15 in the brushless motor 11 protrudes into the through-hole 35. The pump member 55 rotates integrally with the rotational shaft 15.

Thus, the rotational shaft 15 can be used to effectively rotate the pump member 55.

The rotational shaft 15 includes, on its distal end, the pinion 20 that reduces the speed of the spindle 22. The pump member 55 is engaged with the pinion 20 and rotates integrally with the pinion 20.

Thus, the pinion 20 can be used to easily rotate the pump member 55 integrally with the rotational shaft 15. The difference in the rotational speed between the pinion 20 and the spindle 22 causes the grease to be fed.

The pump member 55 includes the spiral groove 56 on its outer peripheral surface.

This allows the grease to be efficiently fed to the sliding surfaces.

The grease supply path has the through-hole 35 located at the axial center of the spindle 22, and the front connection hole 51 and the rear connection hole 52 (examples of a connection hole) that are connected to the through-hole 35, extend in the radial direction of the spindle 22, and are open in the outer peripheral surface of the spindle 22.

This structure easily defines the grease supply path and allows efficient supply of grease to the sliding surfaces under a centrifugal force in response to rotation of the spindle 22.

The front end of the spindle 22 and the rear end of the anvil 25 are coaxially fitted to each other. The through-hole 35 extends beyond the front connection hole 51 to the fitting portion between the front end of the spindle 22 and the rear end of the anvil 25.

This structure allows effective lubrication of the fitting portion between the spindle 22 and the anvil 25.

The rotation member 55 is received in the through-hole 35.

Thus, the through-hole 35 allows easy installation of the pump member 55.

In the first embodiment, the pump member may have the groove with the width, depth, and other features changed as appropriate. The cross section of the groove is not limited to the semicircular cross section, and may be V-shaped.

The pump member may include multiple grooves. In this case, the width, depth, and cross-sectional shape of each groove may be changed.

The pump member may include multiple components.

Second Embodiment

A second embodiment of the present disclosure will now be described. The structure according to the present embodiment is the same as in the first embodiment except an accelerator included in a striker, and will be described focusing on the accelerator.

Figure 5:
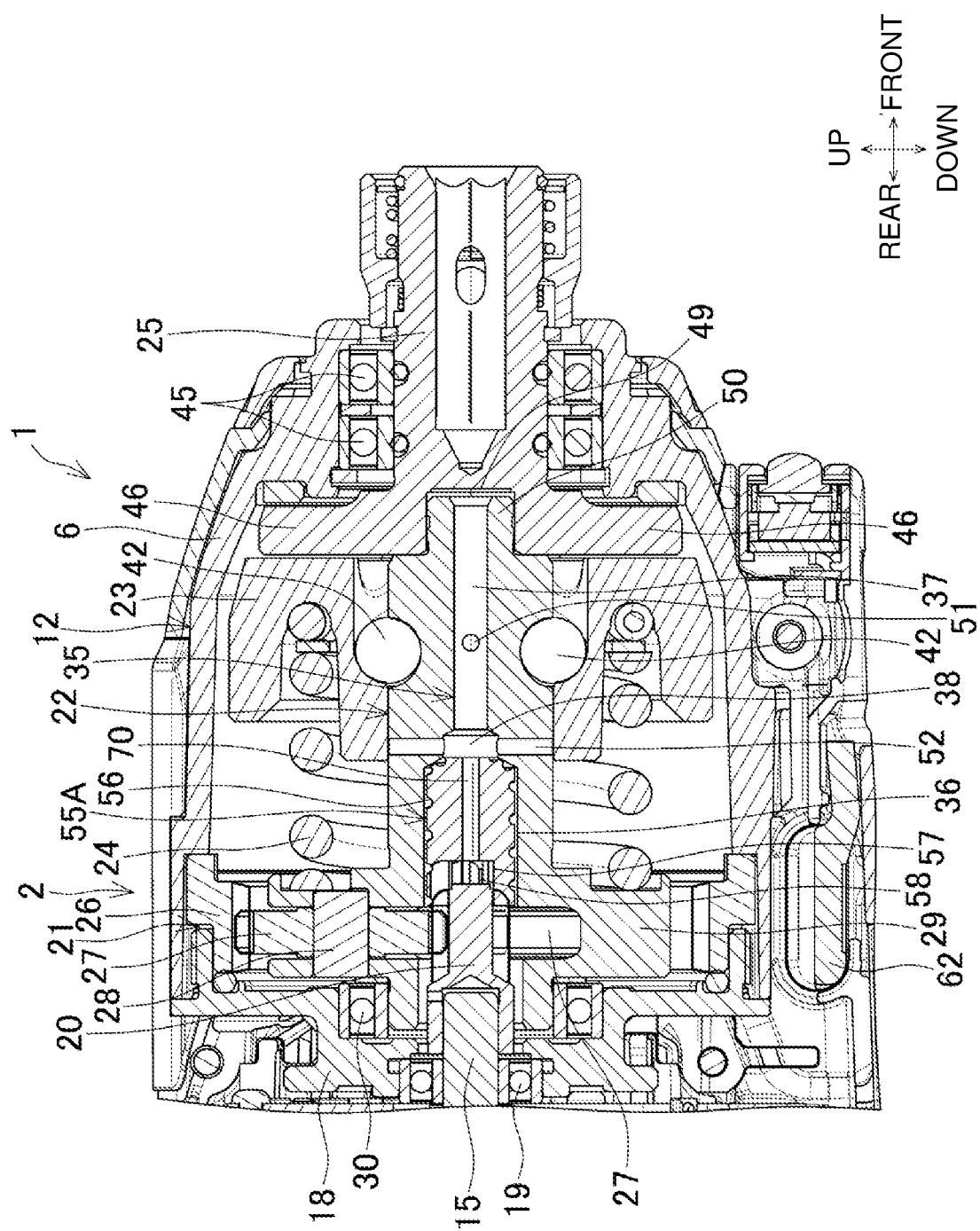
FIG. 5 is a longitudinal central sectional view of a striker in an impact driver according to a second embodiment.

A pump member 55A in a striker 12 shown in FIG. 5 has, at its axial center, a bypass hole 70 that extends through the pump member 55A in the front-rear direction.

The pump member 55A in the striker 12 in the present embodiment rotates (rotates frontward) integrally with a rotational shaft 15 and a pinion 20 in response to rotation of the rotational shaft 15 and the pinion 20. This causes grease between the outer peripheral surface of the pump member 55A and the inner peripheral surface of a larger-diameter hole 36 to be fed forward along a groove 56 that rotates, as described in the first embodiment. At the same time, grease in a blind hole 57 in the pump member 55A flows through the bypass hole 70 and reaches a medium-diameter hole 38. A grease portion fed from the groove 56 and a grease portion fed from the bypass hole 70 meet at the medium-diameter hole 38. A portion of the grease is then supplied to the sliding surfaces of a spindle 22 and a hammer 23 through a rear connection hole 52 under a centrifugal force. The other effects are the same as in the first embodiment.

In the impact driver 1 according to the second embodiment as well, the spindle 22 has a through-hole 35, a front connection hole 51, and the rear connection hole 52 that are open in the sliding surface of the spindle 22 on which the hammer 23 slides to allow grease to be supplied to the sliding surface. The spindle 22 also includes the pump member 55A that accelerates the flow of the grease onto the sliding surface in the through-hole 35 in response to rotation of a brushless motor 11.

The pump member 55A allows supply of a sufficient amount of grease to the sliding surfaces of the spindle 22 and the hammer 23. In particular, the pump member 55A has the bypass hole 70 that extends through the pump member 55A in the axial direction, thus allowing a large amount of grease to be supplied to the sliding surfaces.

In the second embodiment as well, the width, depth, and other features of the groove on the pump member may be changed as appropriate. The cross section of the groove is not limited to the semicircular cross section, and may be V-shaped.

The pump member may include multiple grooves. In this case, the width, depth, and cross-sectional shape of each groove may be changed.

The bypass hole may not be located at the axial center of the pump member. The pump member may have multiple bypass holes.

The pump member may include multiple components.

Third Embodiment

Figure 6:
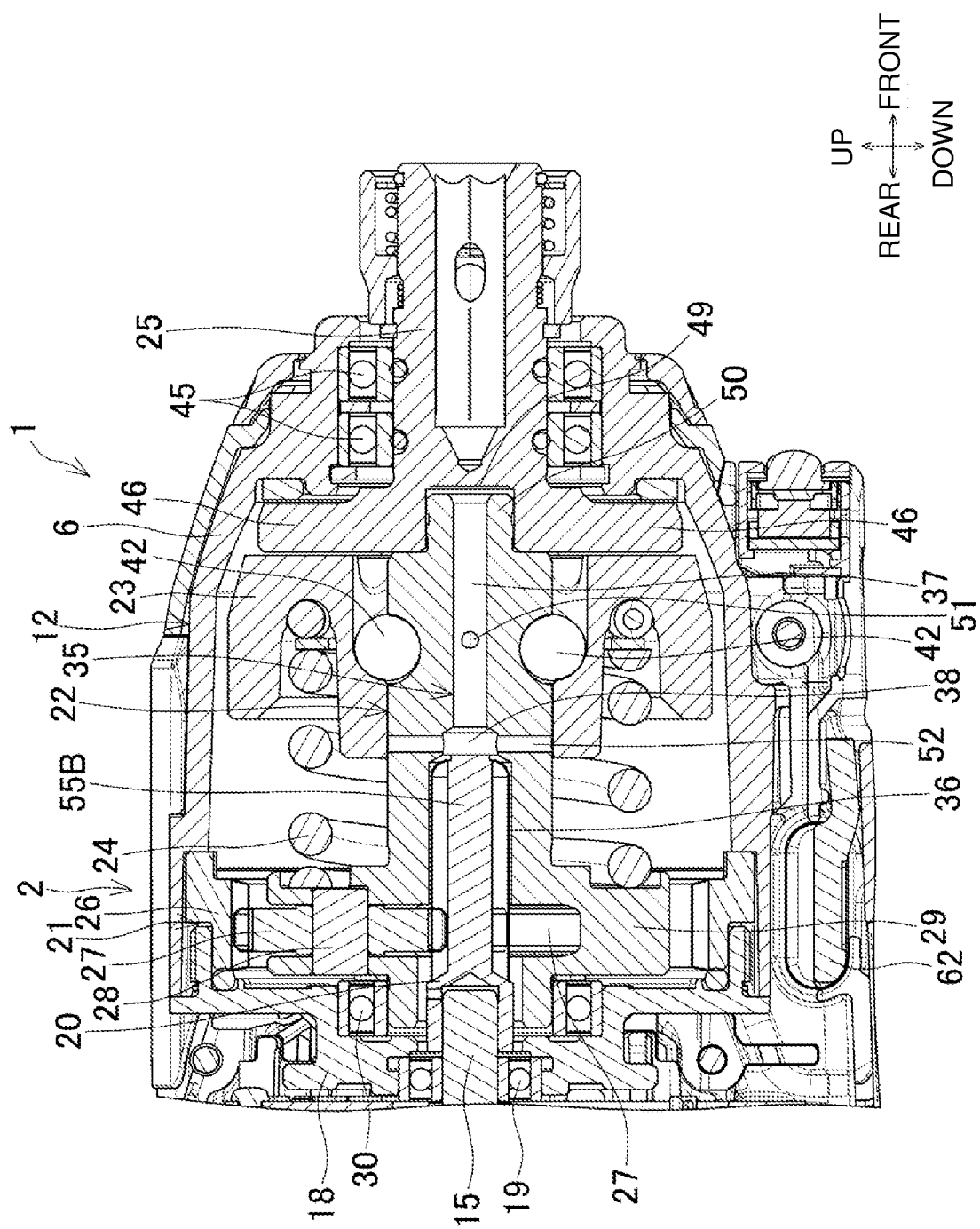
FIG. 6 is a longitudinal central sectional view of a striker in an impact driver according to a third embodiment.

A striker 12 in a third embodiment shown in FIG. 6 includes a pump member that also functions as a pinion 20. The pinion 20 extending frontward in a gear shape has its front surface near the front inner surface of a larger-diameter hole 36. More specifically, the pinion 20 includes, as a pump 55B, a portion extending frontward from its portion engaged with planetary gears 27.

In response to rotation (frontward rotation) of a rotational shaft 15 and the pinion 20 in the striker 12 in the present embodiment, grease in the larger-diameter hole 36 is fed forward through the pump 55B in the pinion 20. The grease reaches a medium-diameter hole 38. A portion of the grease is then supplied to the sliding surfaces of a spindle 22 and a hammer 23 through a rear connection hole 52 under a centrifugal force. The other effects are the same as in the first embodiment.

In the impact driver 1 according to the third embodiment as well, the spindle 22 has a through-hole 35, a front connection hole 51, and the rear connection hole 52 that are open in the sliding surface of the spindle 22 on which the hammer 23 slides to allow grease to be supplied to the sliding surface. The impact driver 1 includes the pump 55B that accelerates the flow of the grease onto the sliding surface in the through-hole 35 in response to rotation of a brushless motor 11.

The pump 55B allows supply of a sufficient amount of grease to the sliding surfaces of the spindle 22 and the hammer 23.

In particular, the pinion 20 is located on the distal end of the rotational shaft 15. The pump member as the pump 55B is integral with the pinion 20. Thus, the pinion 20 allows easy installation of the pump member.

In the third embodiment, the pump on the pinion may not be a gear with straight teeth. For example, the gear may be a helical gear. The pump may be a shaft having a circular cross section and having a spiral groove on its outer peripheral surface, as in the first embodiment.

The length of the pump in the front-rear direction may be changed as appropriate.

Fourth Embodiment

Figure 7:
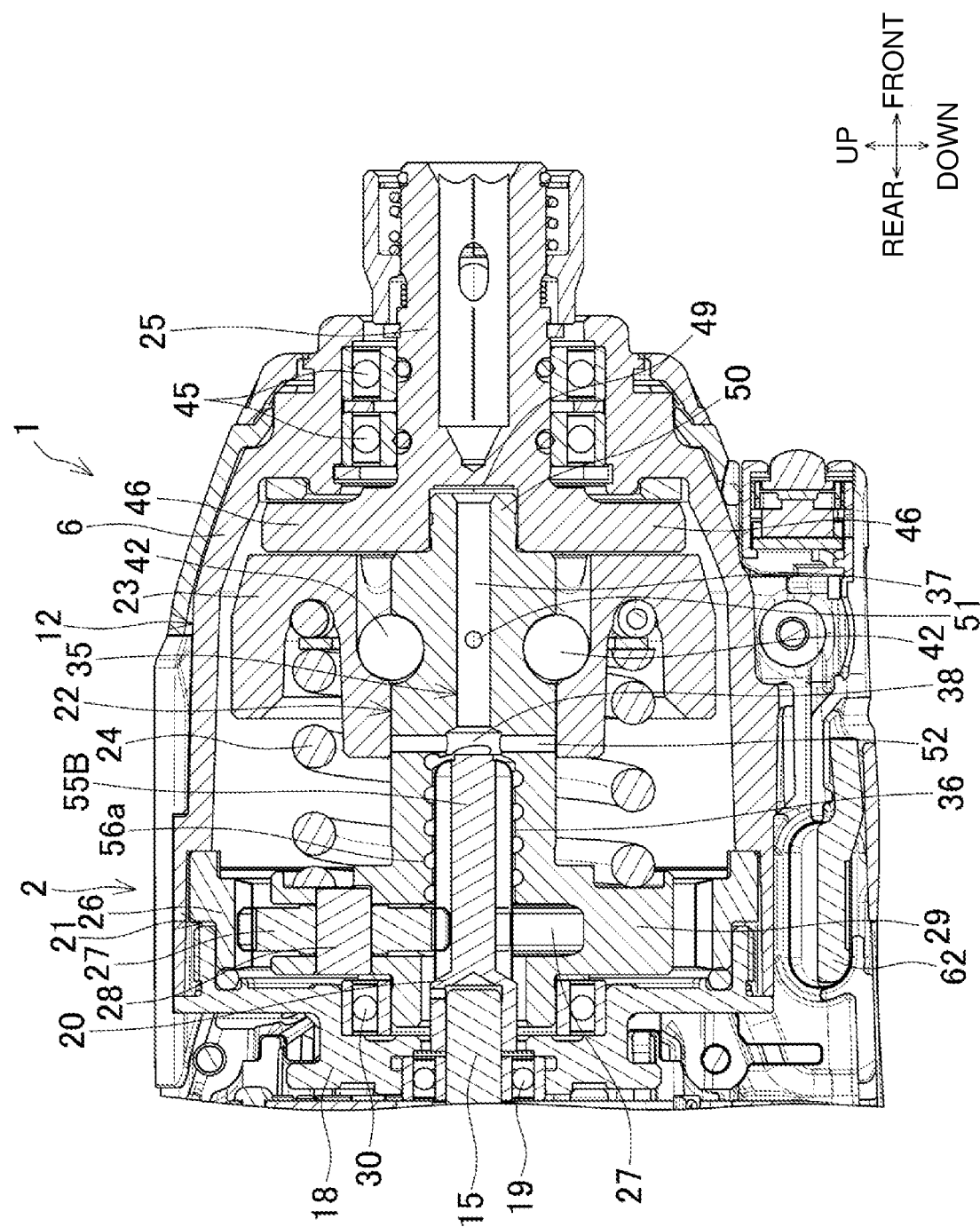
FIG. 7 is a longitudinal central sectional view of a striker in an impact driver according to a fourth embodiment.

In a striker 12 in a fourth embodiment shown in FIG. 7, a pinion 20 also functions as a pump member, as in the third embodiment. The pinion 20 includes, as a pump 55B, a portion extending frontward to have its front surface near the front inner surface of a larger-diameter hole 36 and extending frontward from its portion engaged with planetary gears 27.

A spiral groove 56a with a semicircular cross section is located frontward from the portion of the pinion 20 that is engaged with the planetary gears 27 on the inner peripheral surface of the larger-diameter hole 36.

In response to rotation (frontward rotation) of a rotational shaft 15 and the pinion 20 in the striker 12 in the present embodiment, grease in the larger-diameter hole 36 is fed forward through the pump 55B in the pinion 20. At the same time, the grease between the inner peripheral surface of the larger-diameter hole 36 and the pump 55B is fed frontward along the groove 56a that rotates. The grease reaches a medium-diameter hole 38. A portion of the grease is then supplied to the sliding surfaces of a spindle 22 and a hammer 23 through a rear connection hole 52 under a centrifugal force. The other effects are the same as in the first embodiment.

In the impact driver 1 according to the fourth embodiment as well, the spindle 22 has a through-hole 35, a front connection hole 51, and the rear connection hole 52 that are open in the sliding surface of the spindle 22 on which the hammer 23 slides to allow grease to be supplied to the sliding surface. The impact driver 1 includes the pump 55B that accelerates the flow of the grease onto the sliding surface in the through-hole 35 in response to rotation of a brushless motor 11.

The pump 55B allows supply of a sufficient amount of grease to the sliding surfaces of the spindle 22 and the hammer 23.

In particular, the pinion 20 is located on the distal end of the rotational shaft 15. The pump member as the pump 55B is integral with the pinion 20. Thus, the pinion 20 allows easy installation of the pump member. The groove 56*a* on the inner peripheral surface of the larger-diameter hole 36 allows grease to be efficiently fed to the sliding surface along the groove 56*a*.

In the fourth embodiment as well, the pump on the pinion may not be a gear with straight teeth. For example, the pump may be a helical gear. The pump may be a shaft having a circular cross section and having a spiral groove on its outer peripheral surface, as in the first embodiment.

The length of the pump in the front-rear direction may be changed as appropriate.

The width, depth, and other features of the groove located on the inner peripheral surface of the larger-diameter hole may be changed as appropriate. The cross section of the groove is not limited to the semicircular cross section, and may be V-shaped.

Multiple grooves may be located on the inner peripheral surface of the larger-diameter hole 36. In this case, the width, depth, and cross-sectional shape of each groove may be changed.

Fifth Embodiment

Figure 8:
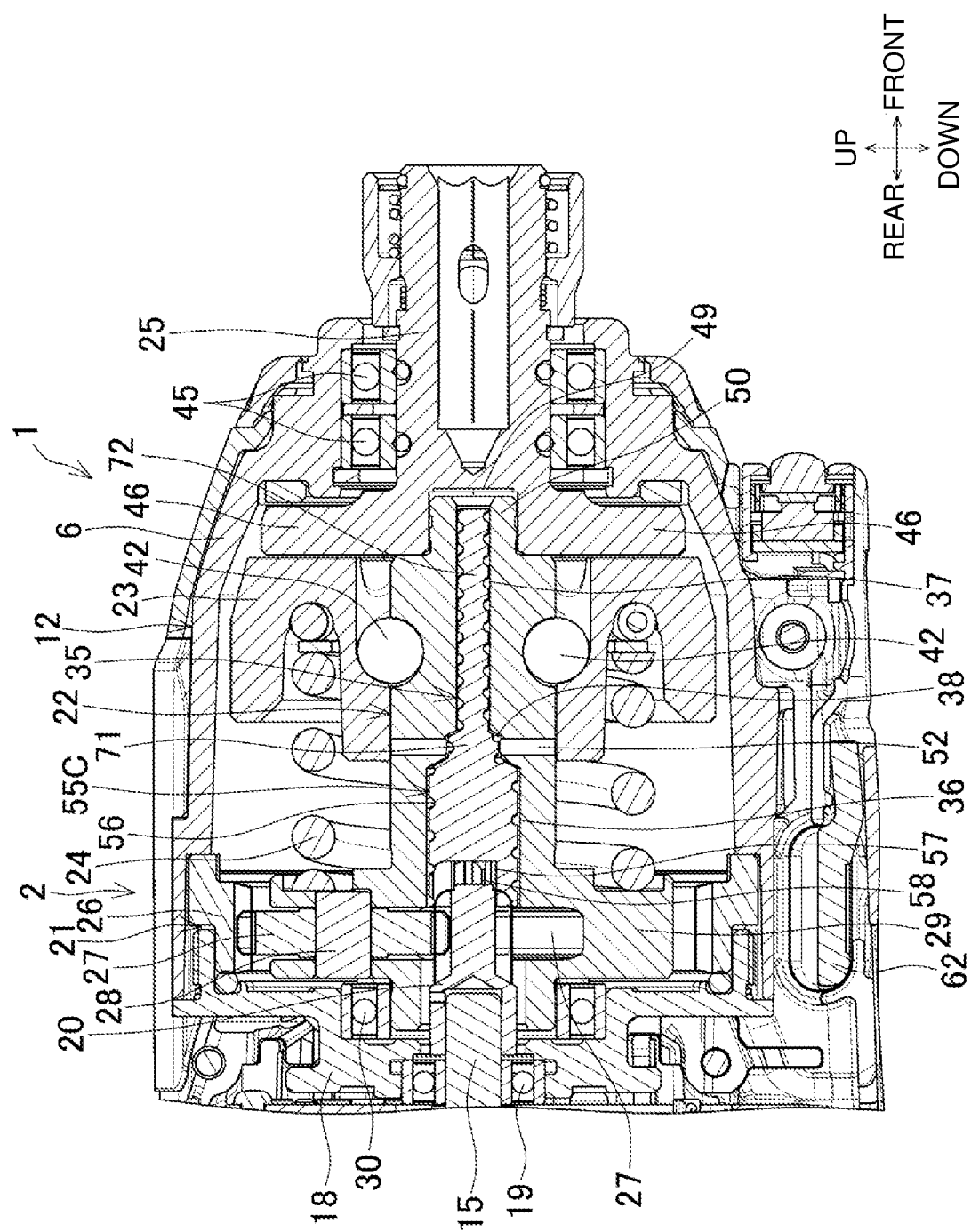
FIG. 8 is a longitudinal central sectional view of a striker in an impact driver according to a fifth embodiment.

In a striker 12 in a fifth embodiment shown in FIG. 8, a pump member 55C extends not only into a larger-diameter hole 36 but also to a position adjacent to the front end of a through-hole 35. The pump member 55C further includes a medium-diameter portion 71 and a smaller-diameter portion 72. The medium-diameter portion 71 is placed in a medium-diameter hole 38. The smaller-diameter portion 72 is placed in a smaller-diameter hole 37. A groove 56 extends continuously from the outer peripheral surface of the medium-diameter portion 71 to the outer peripheral surface of the smaller-diameter portion 72. The pump member 55C in the striker 12 in the present embodiment rotates (rotates frontward) integrally with a rotational shaft 15 and a pinion 20 in response to rotation of the rotational shaft 15 and the pinion 20. This causes grease between the outer peripheral surface of the pump member 55C and the inner peripheral surface of a larger-diameter hole 36 to be fed forward along a groove 56 that rotates, as described in the first embodiment. The grease reaches the outer peripheral surface of the medium-diameter hole 38. A portion of the grease is then supplied to the sliding surfaces of a spindle 22 and a hammer 23 through a rear connection hole 52 under a centrifugal force. Another portion of the grease is fed frontward in the smaller-diameter hole 37 along the groove 56 in the smaller-diameter portion 72. A portion of the other portion of the grease is then supplied halfway to the sliding surfaces of the spindle 22 and the hammer 23 through the front connection hole 51 under a centrifugal force. The remaining portion of the other portion of the grease is fed to a fitting recess 49 from the smaller-diameter hole 37.

In the impact driver 1 according to the fifth embodiment as well, the spindle 22 has a through-hole 35, a front connection hole 51, and the rear connection hole 52 that are open in the sliding surface of the spindle 22 on which the hammer 23 slides to allow grease to be supplied to the sliding surface. The spindle 22 also includes the pump member 55C that accelerates the flow of the grease onto the sliding surface in the through-hole 35 in response to rotation of a brushless motor 11.

The pump member 55C allows supply of a sufficient amount of grease to the sliding surfaces of the spindle 22 and the hammer 23. In particular, the pump member 55C extends beyond the front connection hole 51 to the front end of the spindle 22. This structure allows effective supply of grease to the fitting portion between the spindle 22 and an anvil 25, thus allowing the fitting portion to remain lubricated.

In the fifth embodiment, the groove on the pump member may not be continuous to the smaller-diameter portion, and may be separate in the medium-diameter portion and in the smaller-diameter portion. The medium-diameter portion and the smaller-diameter portion may have grooves with different structures, or may have features other than grooves.

The pump member may include multiple components.

Sixth Embodiment

Figure 9:
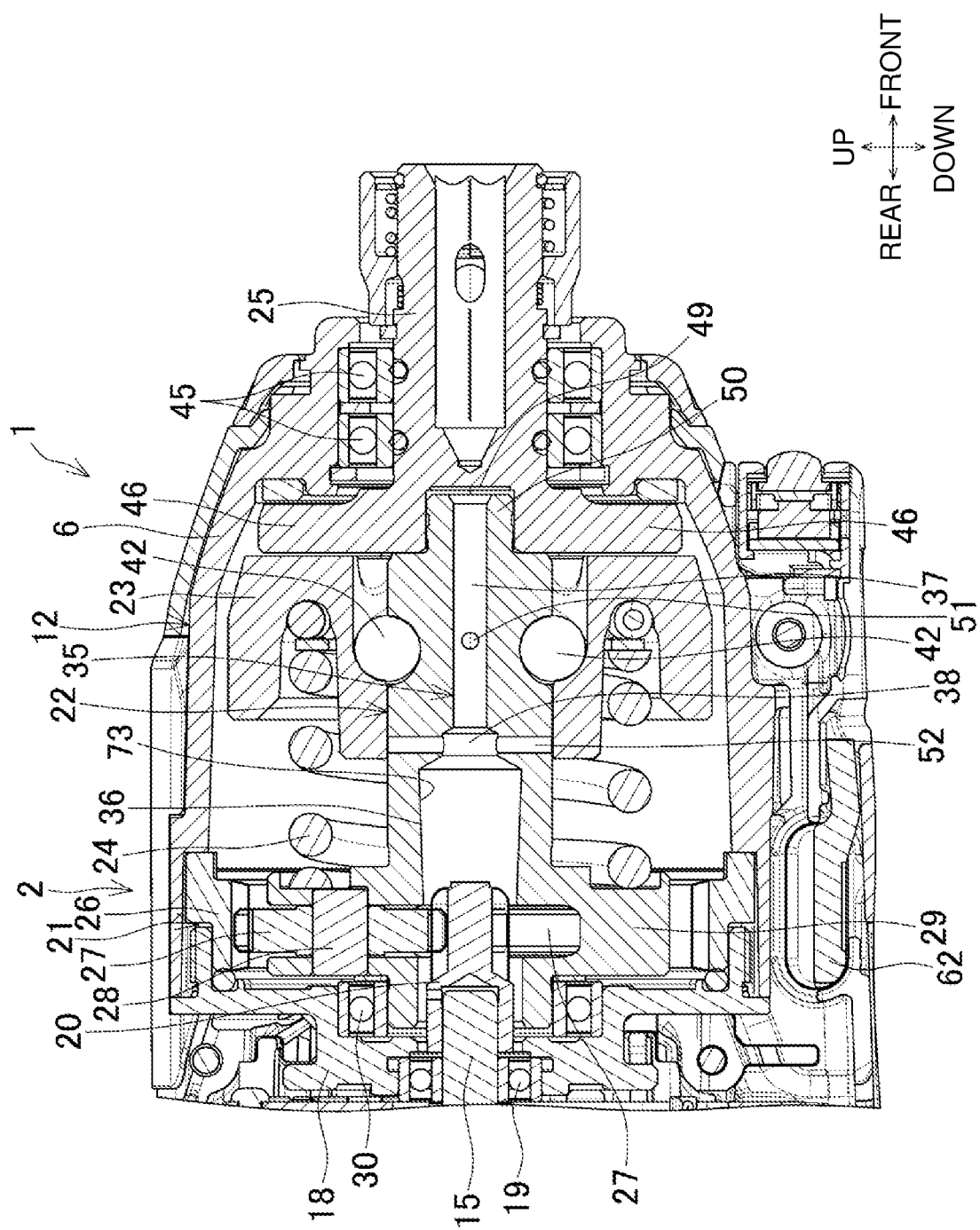
FIG. 9 is a longitudinal central sectional view of a striker in an impact driver according to a sixth embodiment.

In a striker 12 in a sixth embodiment shown in FIG. 9, a spindle 22 does not include a pump member. In the present embodiment, the spindle 22 has a larger-diameter hole 36 with a slope portion 73. The larger-diameter hole 36 thus has an internal diameter gradually increasing frontward.

In response to rotation (frontward rotation) of a rotational shaft 15 and a pinion 20 in the striker 12 in the present embodiment, grease in the larger-diameter hole 36 is fed forward along the inner surface of the slope portion 73 under a centrifugal force. The grease accumulates on the front end of the larger-diameter hole 36 and then overflows into a medium-diameter hole 38. A portion of the grease is then supplied to the sliding surfaces of the spindle 22 and a hammer 23 through a rear connection hole 52 under a centrifugal force. The other effects are the same as in the first embodiment.

In the impact driver 1 according to the sixth embodiment as well, the spindle 22 has a through-hole 35, a front connection hole 51, and the rear connection hole 52 that are open in the sliding surface of the spindle 22 on which the hammer 23 slides to allow grease to be supplied to the sliding surface. The spindle 22 also includes the slope portion 73 (an example of an accelerator) that accelerates the flow of the grease onto the sliding surface in the through-hole 35 in response to rotation of the brushless motor 11.

The slope portion 73 allows supply of a sufficient amount of grease to the sliding surfaces of the spindle 22 and the hammer 23. In particular, the accelerator is the slope portion 73 defined by the internal diameter of the larger-diameter hole 36 in the spindle gradually increasing frontward. This allows grease to be fed under a centrifugal force. The accelerator has a simple structure. This structure eliminates the pump member and may reduce the cost as compared with the structures according to other embodiments.

In the sixth embodiment, the slope portion may extend frontward and connect directly to the rear connection hole, with the medium-diameter hole being eliminated.

The slope portion may have a spiral groove on the inner peripheral surface.

Other modifications will now be described.

Each of the above embodiments may not be implemented alone but may be combined with one another.

For example, the structure according to the second embodiment shown in FIG. 5 may be combined with the structure according to the sixth embodiment shown in FIG. 9 to form a slope defined by the internal diameter of the larger-diameter hole gradually increasing frontward. The gap between the larger-diameter hole and the pump member defines the slope. This produces an additional effect of allowing grease to be fed under a centrifugal force, in addition to the grease being fed along the groove. The same applies to the structure according to the third embodiment shown in FIG. 6 and to the structure according to the fifth embodiment shown in FIG. 8. More specifically, the structure according to embodiment shown in FIG. 9 can be combined with the structure according to any embodiment.

The structure according to the fifth embodiment shown in FIG. 8 may have the bypass hole described in the second embodiment in FIG. 5. In this case, the bypass hole may extend to the front end of the smaller-diameter portion, or may extend halfway to the medium-diameter portion or to the smaller-diameter portion and be open in the outer peripheral surface of the pump member through the through-hole orthogonal to the axial center.

The structures according to the first embodiment in FIG. 2, the second embodiment in FIG. 5, and the fifth embodiment in FIG. 8 may each include the groove on the inner peripheral surface of the larger-diameter hole in the fourth embodiment in FIG. 7. This produces an additional effect of allowing grease to be fed under a centrifugal force, in addition to the grease being fed along the groove on the outer peripheral surface of the pump member.

When the grease supply path includes the accelerator as in the sixth embodiment, the shape of the accelerator is not limited to the slope portion described in the above embodiment. For example, the larger-diameter hole may not be tapered, and may include a spiral groove alone on its inner peripheral surface. In this case, the larger-diameter hole may function as the accelerator. The groove is not limited to the spiral groove. The groove may be, for example, a rectangular groove extending in the axial direction of the spindle to feed grease.

The reducer may include any other number of planetary gears. The reducer may include, in the axial direction, internal gears and planetary gears in multiple stages. The reducer is not limited to the structure using the planetary gears.

The fitting structure between the spindle and the anvil may be reversed from the fitting structure described in the above embodiments. More specifically, the fitting recess may be located on the front end of the spindle, and the fitting protrusion may be located on the rear end of the anvil.

The striker unit is not limited to the striker in each of the above embodiments. For example, the striker unit may include the hammer that does not move in the front-rear direction. For example, the striker unit may include the anvil located behind the hammer. For example, the striker unit may have any other structure including no hammer or may have the structure that is changed as appropriate. In any such example, any other structure including the motor, the striker unit drivable by the motor, the anvil that is struck in the rotation direction by the striker unit, and the accelerator that accelerates the flow of grease supplied to the striker unit can supply a sufficient amount of grease to the striker unit.

The motor is not limited to the brushless motor. The power source is not limited to a battery pack, but may be utility power.

The present disclosure is also applicable to impact tools other than an impact drive, such as an angle impact driver.

REFERENCE SIGNS LIST 1 impact driver
2 body
3 grip
4 body housing
6 hammer case
11 brushless motor
12 striker
15 rotational shaft
18 bearing box
20 pinion
21 reducer
22 spindle
23 hammer
24 coil spring
25 anvil
29 carrier
35 through-hole
36 larger-diameter hole
37 smaller-diameter hole
38 medium-diameter hole
51 front connection hole
52 rear connection hole
55, 55A, 55C pump member
55B pump
56, 56a groove
57 blind hole
58 engagement portion
60 switch
66 controller
70 bypass hole
71 medium-diameter portion
72 smaller-diameter portion
73 slope portion

What is claimed is:

1. An impact tool, comprising:
a motor;
a spindle rotatable by the motor;
a hammer externally and coaxially mounted on the spindle, the hammer being configured to receive rotation of the spindle and movable relative to the spindle in an axial direction;
an anvil located in front of the hammer and coaxial with the spindle, the anvil being configured to be struck by the hammer in a rotation direction; and
a hammer case accommodating the spindle, the hammer, and the anvil, the hammer case allowing a front end of the anvil to protrude frontward from the hammer case, the hammer case being filled with grease,
wherein the spindle includes
a grease supply path located in the spindle, the grease supply path being open in a sliding surface of the spindle on which the hammer slides, the grease supply path allowing grease to be supplied to the sliding surface, and
an accelerator disposed in the spindle, the accelerator being configured to accelerate a flow of the grease onto the sliding surface along the grease supply path in response to rotation of the motor, wherein
the accelerator includes a rotation member rotatable on the grease supply path in response to rotation of the motor.

2. The impact tool according to claim 1, wherein
the motor includes a rotational shaft protruding into the grease supply path, and
the rotation member rotates integrally with the rotational shaft.

3. The impact tool according to claim 2, wherein
the rotational shaft has a distal end including a pinion to reduce a speed of the spindle, and
the rotation member is engaged with the pinion and rotatable integrally with the pinion.

4. The impact tool according to claim 3, wherein
the rotation member has an outer peripheral surface including a spiral groove.

5. The impact tool according to claim 3, wherein the grease supply path has an inner peripheral surface including a spiral groove.

6. The impact tool according to claim 2, wherein the rotational shaft has a distal end including a pinion, and the rotation member is integral with the pinion.

7. The impact tool according to claim 6, wherein the rotation member has an outer peripheral surface including a spiral groove.

8. The impact tool according to claim 6, wherein the grease supply path has an inner peripheral surface including a spiral groove.

9. The impact tool according to claim 2, wherein the rotation member has an outer peripheral surface including a spiral groove.

10. The impact tool according to claim 2, wherein the grease supply path has an inner peripheral surface including a spiral groove.

11. The impact tool according to claim 1, wherein the rotation member has an outer peripheral surface including a spiral groove.

12. The impact tool according to claim 1, wherein the grease supply path has an inner peripheral surface including a spiral groove.

13. The impact tool according to claim 1, wherein the grease supply path and the rotation member define a space in between, and the space enlarges gradually frontward.

14. The impact tool according to claim 1, wherein the grease supply path has
   a through-hole at an axial center of the spindle, and
   a connection hole connected to the through-hole, extending in a radial direction of the spindle, and open in an outer peripheral surface of the spindle.

15. The impact tool according to claim 14, wherein a front end of the spindle and a rear end of the anvil are coaxially fitted to each other, and
the through-hole extends beyond the connection hole to a fitting portion between the front end of the spindle and the rear end of the anvil.

16. The impact tool according to claim 15, wherein the rotation member extends beyond the connection hole to the front end of the spindle.

17. The impact tool according to claim 14, wherein the rotation member is received in the through-hole.

18. An impact tool, comprising:
a motor;
a spindle rotatable by the motor;
a hammer externally and coaxially mounted on the spindle, the hammer being configured to receive rotation of the spindle and movable relative to the spindle in an axial direction;
an anvil located in front of the hammer and coaxial with the spindle, the anvil being configured to be struck by the hammer in a rotation direction; and
a hammer case accommodating the spindle, the hammer, and the anvil, the hammer case allowing a front end of the anvil to protrude frontward from the hammer case, the hammer case being filled with grease,
wherein the spindle includes
   a grease supply path located in the spindle, the grease supply path being open in a sliding surface of the spindle on which the hammer slides, the grease supply path allowing grease to be supplied to the sliding surface, and
   an accelerator disposed in the spindle, the accelerator being configured to accelerate a flow of the grease onto the sliding surface along the grease supply path in response to rotation of the motor, wherein
the accelerator includes a slope portion defined by an inner diameter of the grease supply path increasing gradually frontward.

19. An impact tool, comprising:
a motor;
a striker unit drivable by the motor, the striker unit including a grease supply path;
an anvil configured to be struck by the striker unit in a rotation direction; and
an accelerator configured to accelerate a flow of grease supplied to the striker unit, wherein
the accelerator includes a rotation member rotatable on the grease supply path in response to rotation of the motor,
the motor includes a rotational shaft protruding into the grease supply path, and
the rotation member rotates integrally with the rotational shaft.

* * * * *